Figure 1:
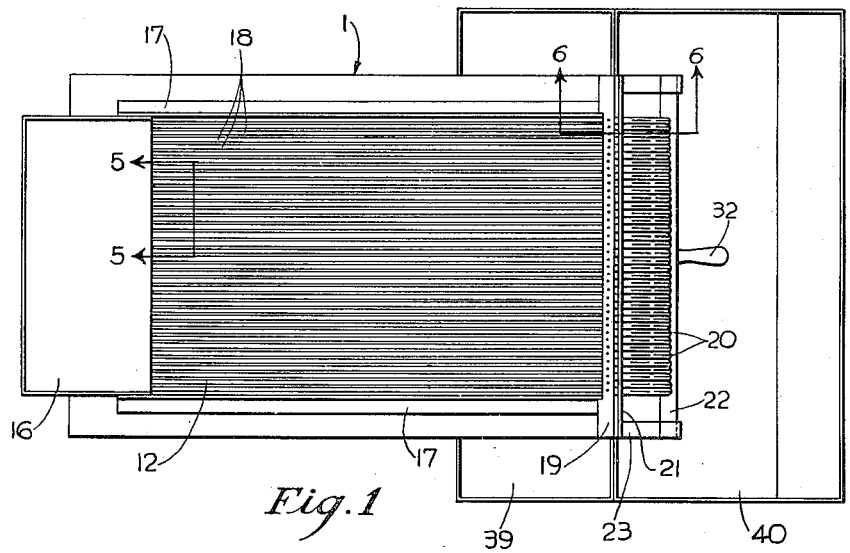

Jan. 10, 1950   J. F. CAMPBELL ET AL   2,494,227
MEANS FOR STRINGING SPRINGS AND THE LIKE
Filed Feb. 1, 1946   2 Sheets-Sheet 1

INVENTORS
John F. Campbell
Herbert E. Riggs
BY
R H Waters

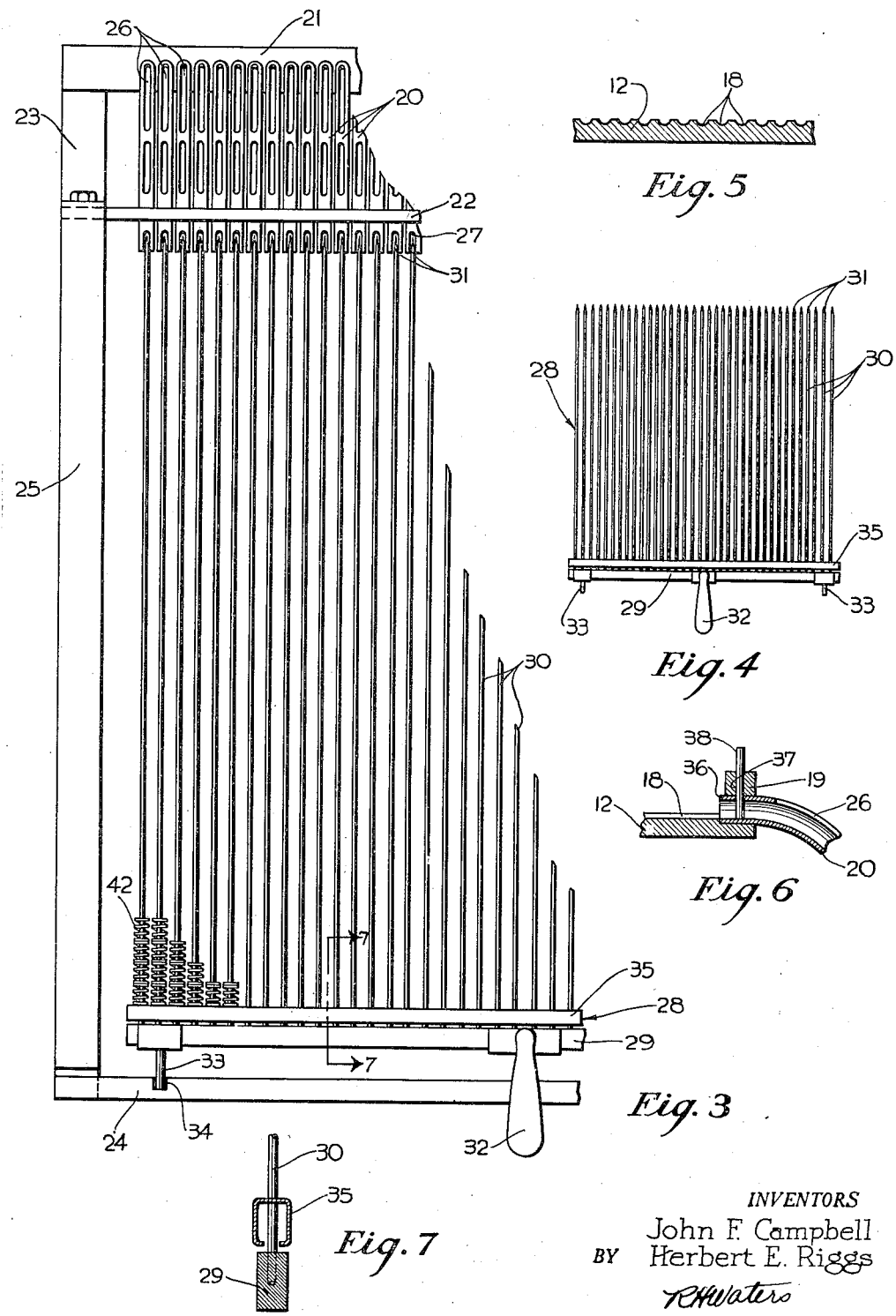

Patented Jan. 10, 1950

2,494,227

UNITED STATES PATENT OFFICE 2,494,227

MEANS FOR STRINGING SPRINGS AND THE LIKE

John F. Campbell, Cuyahoga Falls, and Herbert E. Riggs, Akron, Ohio, assignors to Wingfoot Corporation, Akron, Ohio, a corporation of Delaware Application February 1, 1946, Serial No. 644,706

3 Claims. (Cl. 214—8)

The present invention relates to apparatus for stringing a plurality of substantially identical articles in stacked and ordered relation. More particularly, the invention is concerned with the separation of a plurality of individual articles of identical character from a mass and arranging the same in a desired stacked relationship.

In the manufacture of certain special types of pneumatic tires such, for example, as a tire having an antiskid tread portion formed of a plurality of individual tread sections or segments arranged in mutual end-to-end relation about the periphery of the tire and embodying a large number of embedded particles or elements to insure a gripping action as the tire tread is worn down in use. It has been found to be particularly advantageous to employ a plurality of substantially identical short helical spring elements disposed in co-axial and end-to-end relation in the tread segments employed in the manufacture of antiskid pneumatic tires. It thus becomes necessary in such operations to assemble a large number of such spring elements temporarily in the arrangements in which they are to be employed in the forming of the tread segments, and since such operations involve a considerable amount of time to perform by hand, the method and apparatus of the present invention has been developed.

It is, therefore, an object of the present invention to provide a method of and means for collecting a plurality of identical articles such, for example, as the short helical spring elements in stacked and ordered relation from a disordered mass of such articles.

It is a further object of the present invention to provide a quick and facile method of arranging and stringing such articles as the short helical springs by impaling them on a suitable collecting means such as a spindle or the like to enable them to be retained temporarily in the desired stacked and ordered relation for their incorporation into the tread segments employed in the manufacture of pneumatic tires.

Another object of the present invention is to provide a simple and inexpensive apparatus for arranging a large number of identical articles, such as the above-mentioned helical spring elements, in end-to-end relation in the manner that they are to be incorporated in the tread section of an antiskid tire and to provide means for temporarily retaining them in the desired relation.

Other objects and advantages of the present invention will be readily apparent as the following detailed description of a typical form of apparatus employing the teachings of the invention and illustrated in the accompanying drawings proceeds.

Figure 2:
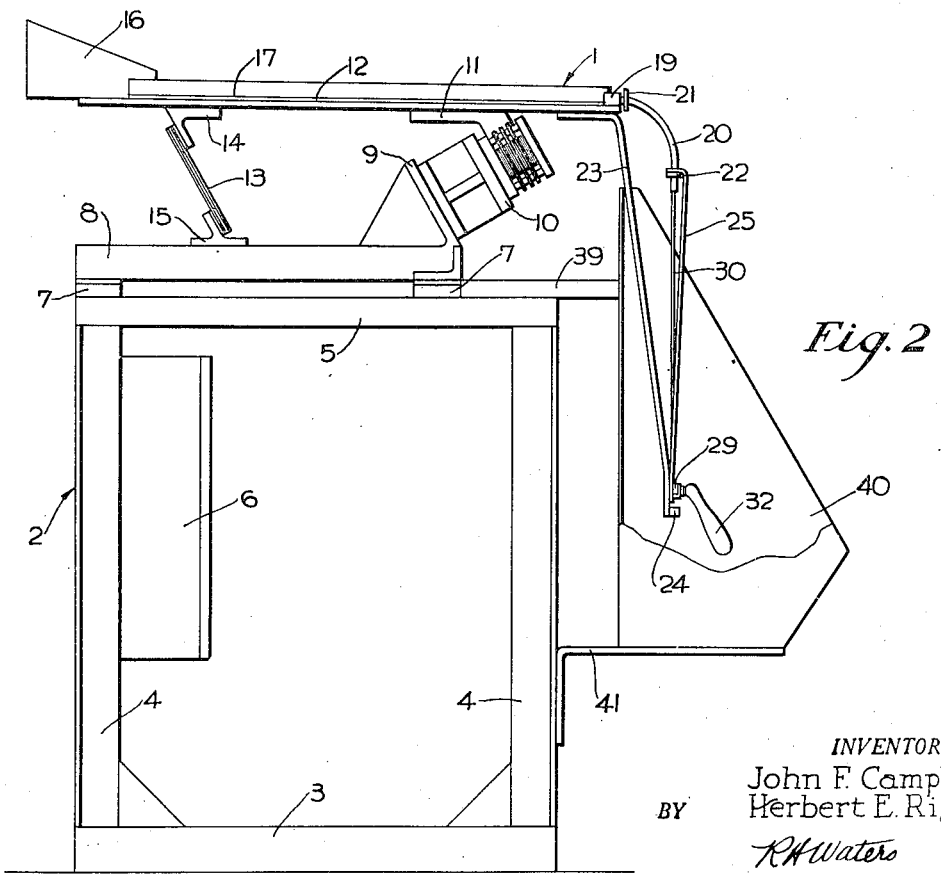

In the drawings, Fig. 1 is a plan view of one form of stringing apparatus embodying the teachings of the present invention. Fig. 2 is a side elevation of the machine of Fig. 1. Fig. 3 is a partial end elevation of the apparatus of Fig. 1, at an enlarged scale, illustrating in detail the collecting means of the apparatus. Fig. 4 illustrates the collecting means in detail when disengaged from the frame which holds it in operable relation in the machine of Fig. 1. Fig. 5 is a partial cross section taken along the line 5—5 in Fig. 1. Fig. 6 is a fragmentary view in cross section along the line 6—6 in Fig. 1. Fig. 7 is a partial cross section taken along the line 7—7 in Fig. 3.

In Figs. 1 and 2 of the drawings, the reference numeral 1 indicates generally the apparatus for stringing a plurality of substantially identical articles such, for example, as short helical springs, heel washers and the like in stacked and ordered relation in accordance with the teachings of the present invention. The stringing machine 1 embodies, among other things, a frame 2 which is made up of a base 3, vertical members 4 and horizontal members 5. A control box 6 for controlling the operation of the apparatus in a manner to be hereinafter described is secured to certain of the uprights 4 of the frame 2 as shown in Fig. 2.

The frame 2 supports on the horizontal members 5 thereof a pair of horizontally disposed cross bars 7 which in turn support a casting 8. The casting 8 is provided with an angularly disposed face 9 to which is secured a suitable agitating means or vibrator unit which may advantageously be of the type known commercially as a "Syntron" unit or the equivalent, indicated by the reference numeral 10. The vibrator unit 10 has an arm 11 affixed thereto which is connected to the under side of a grooved plate 12. The plate 12, in addition to its support by the arm 11, is supported by a leaf spring 13 secured thereto by a bracket 14. The leaf spring 13 is attached at its other end by means of a bracket 15 to the casting 8 and affords complete freedom of vibration of the plate 12 in response to the pulsations provided by the vibrator unit 10. It will be noted from Fig. 2 of the drawings that the plate 12 is approximately horizontal, being slightly inclined, with its left hand extremity disposed a trifle above the right hand extremity thereof.

At the uppermost end of the inclined grooved plate 12 is disposed a supply bin 16 in which are placed the articles which are to be separated and stacked by the operation of the stringing machine 1. An angle 17 is secured to each side of the grooved plate 12 extending parallel to the several grooves 18 which emanate from the supply bin 16 and extend lengthwise of the plate 12. A laterally extending bar 19 is provided at the lowermost end of the inclined plate 12 and serves to provide the portal for each of a series of directing means which take the form of curved tubes 20.

The several tubes 20 are disposed in parallel relation to each other and secured together adjacent their ends as by means of the laterally extending strips 21 and 22. A substantially vertically extending support 23 is secured to the under side of the plate 12 adjacent each edge thereof and extending downwardly to support a cross member 24 secured therebetween. The cross member 24 is secured adjacent its ends to a pair of vertically extending strips 25 which are, in turn, secured to the lateral strip 22 adjacent the lowermost end of the several tubes 20.

The several tubes 20 are provided with slots 26 formed in the outermost portion of the curved outer wall thereof to enable the operator to inspect the passage of the articles to be stacked, in this instance, the short helical spring elements, as they pass therethrough. Each of the tubes 20 is also provided with a slot 27 cut into the lowermost end thereof for cooperation with the collecting means 28 which is advantageously disengageably mounted upon the cross member 24.

The collecting means 28 has a cross bar 29 at the base thereof in which is disposed a plurality of spindles 30 which extend upwardly in spaced and parallel relation to each other in such manner as they will register with the slots 27 in the lowermost ends of the curved tubes 20 when the collecting means 28 is positioned in the apparatus in the manner illustrated in Fig. 3 of the drawings. The spindles 30, which, when in position, extend axially of the open ends of the tubes 20, are provided with pointed ends 31 to facilitate the threading of the articles to be stacked thereon. A handle 32, secured to the bar 29, enables the operator to disengage the collecting means 28 from the stringing machine 1 when the spindles 30 are filled.

The bar 29 of the collecting means 28 is provided with a pair of pins 33 on the opposite side thereof from the spindles 30. The pins 33 are adapted to register with grooves 34 cut into the uppermost surface of the cross member 24. The pins 33 and the grooves 34 cooperate to support the collecting means 28 in the desired vertical relationship to the several tubes 20 during the operation of threading the articles to be stacked upon the several spindles 30.

Any suitable means may be provided on the collecting means 28 to facilitate the removal of the several articles from the spindles 30, such, for example, as the stripper bar 35 which takes the form of a channel as illustrated in Fig. 7. The stripper bar 35 has a plurality of spaced holes in one of the legs thereof to receive the several spindles 30 which extend therethrough. Thus, it is possible to insure the complete and orderly removal of the several articles stacked upon the spindles 30 in the preparation of the tread segments and thereby enabling the collecting means 28 to be used again.

The bar 19 on the end of the plate 12 is advantageously provided with a series of spaced holes 36 through which the ends of the tubes 20 extend as shown in Fig. 6 to enable the inner diameter of the several tubes to register with their respective grooves 18 in the plate 12. A series of vertical holes 37 may also be provided in the bar 19 at right angles to the axis of the tubes 20 at that point for the reception of pins 38 which serve to provide a selective control for the utilization of only certain ones of the several tubes 20 in providing any desired number of series of stacked articles which may be required.

A pan 39, supported by the horizontal members 5 of the frame 2 beneath the lowermost end of the grooved plate 12, provides a means of preventing any of the articles being arranged and stacked by the apparatus from falling upon the floor about the machine. A bin 40, supported by a pair of brackets 41 from the upright members 4 of the frame 2, also provides a receptacle into which will fall any of the springs which may inadvertently pass the bar 19 in the operation of the apparatus.

The stringing machine 1 is operated by actuating the controls in the box 6 to start and stop the operation of the vibrator unit 10. The vibrator unit 10, upon being energized, sets up a series of short vigorous pulsations in the plate 12 so that a scoopful of articles to be arranged and stacked, such as the spring elements 42 of the type shown in Fig. 3, when placed in the bin 16, will begin to move lengthwise of the inclined plate 12. Each spring element 42 will attempt to arrange itself in substantially co-axial relation to one of the series of grooves 18 in plate 12.

The continued vibration of the plate 12 will cause the springs to ride down the grooves 18 into the end of the tubes 20 which direct them to the spindles 30. The spindles 30 extending upwardly into the open lowermost end of the tubes 20 serve to impale the spring elements 42 in the manner indicated in Fig. 3. When the collecting means 28 has all of the spindles 30 thereof filled, it is disengaged from the cross member 24 by the operator and is then ready to be employed in the placing of the springs 42 in the rubber material which is employed in the manufacture of the tread sections in which the springs are to be embedded.

Numerous modifications may be made in the apparatus without departing from the spirit or scope of the invention.

While in accordance with the patent statutes, one best known embodiment of the invention has been illustrated and described in detail, it is to be particularly understood that the invention is not limited thereto or thereby, but that the inventive scope is defined in the appended claims.

We claim:

1. Apparatus for stringing a plurality of substantially identical short helical spring elements in stacked and ordered relation comprising a supply bin, an inclined grooved plate, means agitating the plate, tubular directing means adjacent the lowermost end of each groove in the plate, a spindle adjacent the open end of each tubular directing means, and a frame disengageably supported below the plate and carrying the spindles.

2. Apparatus for stringing a plurality of substantially identical short helical spring elements in stacked and ordered relation comprising a supply bin, a plate having a plurality of spaced generally parallel grooves, said plate being supported in inclined relation with the supply bin at the uppermost end thereof, an abutment adjacent the lower end of the plate, a plurality of spaced generally parallel tubes extending through the abutment, said tubes being disposed in registration with the grooves in the plate, a plurality of collecting spindles each of which is arranged in the registration with an end of one of the tubes, and a support for the spindles which enables the disengagement thereof from the apparatus.

3. Apparatus for stringing a plurality of substantially identical short helical spring elements in stacked and ordered relation comprising means providing an approximately horizontally disposed surface; supply means at one end of the surface means for supplying thereto a disordered mass of the spring elements to be arranged; means on the surface means for arranging spring elements in a plurality of series with the several elements in each series in generally coaxial relation; vibrating means for supporting and imparting motion to the surface means and facilitating the separation and arrangement of the spring elements thereon; tubular directing means at the end of the surface means opposite the supply means thereof; spindle means associated with each of the directing means and disposed substantially normal to the surface means for collecting from each of said directing means a series of the coaxially arranged elements in stacked end-to-end relation; and frame means supporting the spindle means disengageably mounted on the surface means.

JOHN F. CAMPBELL.
HERBERT E. RIGGS.

REFERENCES CITED

The following references are of record in the file of this patent:

UNITED STATES PATENTS

| Number | Name | Date |
|---|---|---|
| 1,096,641 | Phifer | May 12, 1914 |
| 1,326,925 | Goldberg | Jan. 6, 1920 |
| 1,701,641 | Skriba | Feb. 12, 1929 |
| 2,173,077 | Minkel | Sept. 12, 1939 |
| 2,186,652 | Orth et al. | Jan. 9, 1940 |